United States Patent [19]

Oswitch et al.

[11] 4,012,542
[45] Mar. 15, 1977

[54] RIGID THERMOSETTING LOAD BEARING COMPOSITIONS

[75] Inventors: Stanley Oswitch, Chagrin Falls; Robert F. Golownia, Northfield; Kevin K. Kipp, Solon, all of Ohio

[73] Assignee: Ferro Corporation, Cleveland, Ohio

[22] Filed: Mar. 12, 1975

[21] Appl. No.: 557,776

Related U.S. Application Data

[60] Division of Ser. No. 353,501, April 23, 1973, Pat. No. 3,914,200, which is a continuation-in-part of Ser. No. 221,430, Jan. 27, 1972, abandoned, which is a continuation-in-part of Ser. No. 846,592, July 31, 1969, abandoned.

[52] U.S. Cl. .............................. 427/302; 260/75 N; 260/75 UA; 427/333
[51] Int. Cl.² .................... C08G 63/52; B05D 3/10
[58] Field of Search .......... 427/136, 302, 333, 340; 260/863, 864, 78.4 UA, 78.4 A, 78.4 E, 89.5 R, 75 UA, 75 N

[56] References Cited

UNITED STATES PATENTS

| | | | |
|---|---|---|---|
| 3,135,625 | 6/1964 | Ingrassia | 427/333 |
| 3,240,619 | 3/1966 | Winchester | 427/302 |
| 3,271,182 | 9/1966 | Varlet | 427/302 |
| 3,271,183 | 9/1966 | Varlet | 427/302 |
| 3,325,304 | 6/1967 | Hauck | 427/333 |
| 3,644,612 | 2/1972 | Meyer et al. | 260/864 |

*Primary Examiner*—James R. Hoffman
*Attorney, Agent, or Firm*—Milton L. Simmons; Wesley B. Taylor

[57] ABSTRACT

A two component system is disclosed for forming rigid polyester reaction products in which each component is storable for an appreciable period of time but reacts upon contact with each other to form the rigid reaction product within a relatively short time. One component comprises a pre-catalyzed polyester resin which normally has a short pot life but which is extended by an excessive amount of an inhibitor. The second component is a synergistic accelerator combination consisting essentially of a metal soap and an aromatic tertiary amine. When the two components interreact, the accelerator combination overcomes the action of the excessive amount of the inhibitor and brings about a normal polymerization of the polyester resin. Optionally, the accelerator combination is part of a fibrous reinforcement and the aromatic amine is solid at room temperatures. This enables the second component to be more readily used in a dry, handleable form for easy storage.

14 Claims, No Drawings

RIGID THERMOSETTING LOAD BEARING COMPOSITIONS

CROSS-REFERENCE TO RELATED APPLICATIONS

This is a division of an application filed Apr. 23, 1973, Ser. No. 353,501, now U.S. Pat. No. 3,914,200 which was a continuation-in-part of an application filed Jan. 27, 1972, Ser. No. 221,430, entitled "Rigid Thermosetting Load Bearing Compositions", now abandoned, which was a continuation-in-part of an earlier application, filed July 31, 1969, Ser. No. 846,592, having the same title, now abandoned.

BACKGROUND OF THE INVENTION

The present invention relates to rigid materials and especially rigid load bearing materials suitable for use as site foundations, roads, helicopter landing pads, aircraft runways, roofing, trench and waterway linings, in making repairs to pipeline and storage vessels, and the like, and to a process for preparing such materials.

The use of polyester resins is quite popular in the plastic industry for fabricating various parts, especially fiber-reinforced parts. In general, the advantages of polyester resins with glass fibers, for example, include lightweight combined with strength, low maintenance of cost, chemical resistance, thermal insulation, ease of forming into diverse shapes, and the like. However, partially cured polyester resins must be catalyzed before they can readily undergo further polymerization to a sufficient final cure.

After addition of a catalyst, polyester resins have a major disadvantage in that they are relatively unstable and have a short pot life of no more than one to two days at ambient temperatures. Moreover, there is a certain amount of complexity in material preparation prior to producing a satisfactory molding, particularly one with fiber reinforcement. For example, the problems related to the weighing, metering, and mixing of quantities of material, including small quantities of catalysts and the like, have not only required some knowledge of chemistry on the part of a fabricator, but the weighing of small quantities causes accurate resin preparation to be a complex and time-consuming process. If too much catalyst becomes mixed into the resin by error of weighing, metering, or calculation, the resulting molding cures too fast, warps, or displays inferior mechanical properties. At times, the resin may prematurely harden in the mixing container or feedline and cause costly cleanup operations as well as materials loss. On the other hand, if too little catalyst is mixed into the resin, the resulting molding may never fully cure and experience premature failure.

Still further, certain resin catalysts such as organic peroxides are hazardous to store by themselves. Because of their oxidizing nature, they are apt to cause fires or explosions in molding shops.

SUMMARY OF THE INVENTION

The present two-component system for forming rigid polyester reaction products does not necessitate any weighing, metering, or mixing of materials prior to use. Fabrication requires only the joining or contacting of one component with the other. Cure of the resin begins shortly after such contact and within less than an hour at room temperatures, more often within minutes, a mechanically sound rigid reaction product is obtained.

The reaction products of the present invention cure under a wide variety of climatic conditions which increases the attractiveness of the system for in-the-field applications.

One component comprises a liquid, curable, unsaturated polyester resin containing a sufficient amount of a peroxide catalyst normally adapted to catalyze further polymerization of the resin. However, in addition an inhibitor is included in this component in an excessive amount to inhibit such catalyzation, for example, for at least one week to as much as nine months. Normally, one would not do this because the resin would require too long to polymerize for any useful application. By initially incorporating a hazardous peroxide catalyst in the polyester resin, although in an inhibited state, the storage problem for a peroxide catalyst by itself is effectively avoided.

The second component of the present system comprises an accelerator combination consisting essentially of a metal soap in which the metal is capable of undergoing a redox reaction, and an aromatic tertiary amine having the formula:

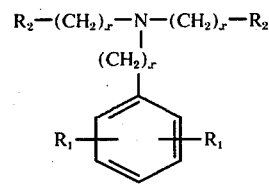

in which $R_1$ represents hydrogen, $CH_3$, or halogen; $R_2$ represents alkyl up to 4 carbon atoms, $R_3OH$ in which $R_3$ is alkylene up to 4 carbon atoms, or phenyl; and in which the $R_1$'s and $R_2$'s may be the same or different and $x$ is 0 or 1.

The two components have excellent stability apart from one another and at room temperatures, that is, from about 65° F to about 85° F. The pre-catalyzed, inhibited polyester resin component is stable for as long as nine months; the accelerator combination component is stable for an indefinite period of time, for example, 3 years or more.

When the two components are contacted with one another, the accelerator combination overcomes the action of the excessive amount of inhibitor and permits normal catalyzation of the polyester resin by the peroxide catalyst to effect cure of the resin in a time substantially matching that in which the resin normally cures. This time is less than 1 hour and usually within a matter of minutes. There is no need for the molder to add catalysts, or other agents or make any calculations, weighings, or meterings. Also controlled and reproducible gel times, exotherms, etc. are obtained. The present system cures at temperatures as low as 0° F and even in the presence of water. These features are of special importance to on-site molders.

In the preferred embodiment, the accelerator combination is part of fibrous reinforcement such as a glass fiber mat, and the aromatic amine is solid at room temperatures to provide a non-tacky, handleable sheet for storage or use. During use, all that needs to be done to produce a structural laminate is to wet out the fibrous reinforcement with the liquid polyester resin and wait. No special skills are required.

DESCRIPTION OF THE PREFERRED EMBODIMENTS

As indicated, one of the two components of the present system comprises a liquid, curable, unsaturated polyester resin containing a peroxide catalyst that is normally adapted to catalyze further polymerization of the polyester resin, and an excessive amount of an inhibitor; and the other component comprises an accelerator combination consisting essentially of a metal soap in which the metal is capable of undergoing a redox reaction, and an aromatic tertiary amine.

Considering these ingredients in greater detail, the polyester resins useful in the present invention are known in the art. Especially when the polymerized polyester reaction product is to be used as a load bearing member, the polyester resin is preferably a thermosetting, unsaturated polyester capable of cross-linking. More particularly, the polyester resin may comprise liquid mixtures of unsaturated alkyd resins having a plurality of alpha-beta ethylenically unsaturated groups and an ethylenically unsaturated monomer. Suitable liquid polyester resins are prepared by reacting polyhydric alcohols with polycarboxylic acids and acid anhydrides. Any of the conventional modifiers can also be employed, as well as the conventional cross-linking monomers.

Exemplary of suitable ethylenically unsaturated dibasic acids are maleic acid and fumaric acid. A suitable ethylenically unsaturated anhydride is maleic anhydride. Exemplary of suitable dihydric alcohols are those having from 2 to 6 carbon atoms to include glycerol, ethylene glycol, propylene glycol, diethylene glycol, triethylene glycol, neo-pentyl glycol or butylene glycol. Exemplary of suitable modifying dibasic acids are the saturated aliphatic acids having from 6 to 10 carbon atoms to include pimelic, azelaic, adipic, suberic, and sebacic. Exemplary of suitable aromatic modifying dibasic acids are phthalic and isophthalic. Exemplary of suitable cross-linking monomers are vinyl and allyl monomers to include styrene, methylmethacrylate, diallylphthalate, divinyl benzene and vinyl toluene. Any unsaturated polyester resin with a viscosity of between about 3 and about 12 poises at 65° F can be employed.

As used here and in the claims, the term "polyester resin" is taken to include a resin as just defined and one which is acrylic-modified. To prepare an acrylic-modified polyester resin, up to about 75% by weight of the cross-linker, such as styrene, is replaced with an alpha or beta acrylic monomer, for example, one having the moiety, $CH_2 = CH—CO—$.

The polyester resins are pre-catalyzed by organic peroxide catalysts and especially those of the cold cure type which include 2,4-dichlorobenzoyl peroxide, t-butylperoxyoctoate, p-chlorobenzoyl peroxide, and benzoyl peroxide. Still other useful peroxide catalysts include methyl ethyl ketone peroxide, cumene hydroperoxide, acetyl peroxide, diacetyl peroxide, phthalic peroxide, diethyl peroxide, and the like. The preferred catalyst is benzoyl peroxide. The polyester catalyst may be present, as an example, in an amount ranging from about 1% to about 6% by weight of the resin.

Any inhibitor known in the art for retarding the polymerization of a polyester resin and which is soluble in the liquid resin may be used. Examples of useful inhibitors include hydroquinone, toluhydroquinone, benzoquinone such as p-benzoquinone, t-butyl catechol, and mixtures of t-butyl catechol and picric acid. Normally, equal amounts of t-butyl catechol and picric acid are used, although the mixture can range from about two parts to about one part of t-butyl catechol to about one part to about two parts of picric acid by weight. The amount of inhibitor used depends on how long the polyester resin is to be inhibited at room temperatures. For example, the amount of inhibitor may range from as little as 0.02% by weight of the resin to 0.2% or more. As a general rule, an amount of about 0.04% of inhibitor by weight of the resin inhibits polymerization satisfactorily for about one month; while about 0.1% to about 0.15% of inhibitor by weight of the resin inhibits polymerization for about 6 to 9 months, both at room temperatures. Inhibition of the resin against polymerization can be made for at least one week, although usually the resin is inhibited for at least one month.

In the synergistic accelerator combination, it is necessary that the metal of the metal soap be one capable of undergoing a redox reaction, and for this purpose the metal must be capable of having at least two valence states. Useful metals include cobalt, vanadium, zirconium, iron, manganese, chromium, tin, aluminum, lead and copper. The metal soap preferably comprises a metal salt of an organic carboxylic acid selected from the group consisting of fatty acids from about 6 carbon atoms to about 20 carbon atoms, benzoic acid, and naphthenic acid. Cobalt naphthanate is preferred.

The amine ingredient of the accelerator combination must be an aromatic tertiary amine having the formula:

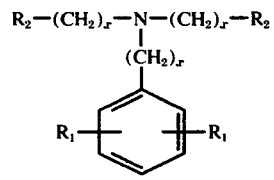

in which $R_1$ represents hydrogen, $CH_3$ or halogen; $R_2$ represents alkyl up to 4 carbon atoms, $R_3OH$ in which $R_3$ is alkylene up to 4 carbon atoms, or phenyl; and in which the $R_1$'s and $R_2$'s may be the same or different and $x$ is 0 or 1. Specific amines of this formula include m-tolyldiethanolamine, phenyldiethanolamine, phenylethylethanolamine, p-bromo-N,N-dimethylaniline, N,N-dimethyl p-toluidine, tribenzyl amine, dimethyl aniline, and bata-phenyldibutylbenzyl amine.

However, in one form of the invention, the accelerator combination is made part of a fibrous reinforcement which, together with the accelerator combination, defines one of the two components of the present system. In this case, it is preferred to form a dry, nonsticky sheet that can be easily handled as in storage and in actual use. In order to obtain the dry, non-tacky form, the aromatic amine should be solid at room temperatures and have the following formula:

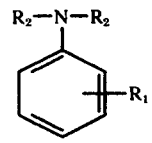

in which $R_1$ represents hydrogen, $CH_3$, or halogen; $R_2$ represents alkyl up to 4 carbon atoms, $R_3OH$ in which $R_3$ represents alkylene up to 4 carbon atoms, or phenyl; and in which the $R_1$'s and $R_2$'s may be the same or different. Specific aromatic tertiary amines that are solid at room temperatures and useful in the present invention include m-tolyldiethanolamine, phenlydiethanolamine, phenylethylethanolamine, and p-bromo-N,N-dimethylaniline.

There are no critical relative proportions of the metal soap and amine. Usually these ingredients are present in a weight ratio of about 1:10 to 1:1, metal soap to amine, respectively, and preferably about 1:5 to 1:7.

In use, the two components of the present system are merely contacted one with the other as by mixing. Preferably, the polyester resin dissolves the accelerator combination for uniform reaction, initiating a rapid polymerization in the system. It has been found that the accelerator combination overcomes the inhibition of the inhibitor in the resin and permits normal catalyzation of the polyester resin by the peroxide catalyst to effect cure of the resin within a normal time for that reaction. As a rule this time is less than one hour and usually is less than a few minutes, depending on the ambient temperature, the chemical nature of the pre-catalyzed resin, and the like. While relative amounts are not critical, the accelerator combination may be mixed with the pre-catalyzed, inhibited polyester resin in an amount of about 0.25 parts to about 4 parts of accelerator combination to about 100 parts by weight of the resin. The resulting mix can be used as a paste or patching material for roads, pipelines, storage vessels, and the like.

When it is desired to prepare load-bearing members directly, a fibrous reinforcement with the accelerator combination preferably forms one of the components of the present two component system. The fibrous reinforcement is usually in sheet or mat form and can comprise natural fibers such as jute, sisal, burlap, paper, and the like, or synthetic resinous fibers. However, glass fibers are preferred because of their high strength to weight ratio.

The accelerator combination is dissolved in a low boiling solvent and then conventionally applied to a fibrous mat or the like as by roller coating or dipping. Removal of the solvent as by evaporation deposits the accelerator combination onto the mat. Any solvent in which the accelerator combination is soluble and which boils between about 40° C and about 100° C can be employed. Preferably, the solvents used dissolve the metal soap and the amine without dissolving the fibrous binder if one is present. Mineral spirits can be used, but generally mixtures of solvents are employed, such as petroleum ether to dissolve the metal soap, and alcohols and ketones like isopropyl alcohol and methyl ethyl ketone, respectively, to dissolve the amines. Acetone can be used in place of isopropyl alcohol, although it tends to dissolve the binder on some fiber mats. In this practice of the invention, the accelerator combination comprises from about 1% to about 10% and preferably between about 5% and about 8% of the weight of the mat. Not only does the metal soap with the amine produce a synergistic effect resulting in higher exotherms, increased hardness, and more rapid cure of the polyester resin, but the metal soap acts as a film-former in tying the amine to the fibers, especially glass fibers. If amines are used alone on a fibrous medium, they tend to become crusty and flake from the fibers during handling.

The following examples are intended only to illustrate the invention and should not be construed as imposing limitations on the claims. Parts are by weight unless otherwise indicated.

EXAMPLE 1

Sixty yards of a 42-inch wide, 2 ounce, non-woven chopped strand mat of fiberglass was treated with a 6.25% solution of 3% cobalt naphthanate and 3% m-tolyldiethanolamine in a solution of 50 parts of acetone and 50 parts of petroleum ether. The mat was treated by passing through a dip tank containing the solution, then over knife-type scrapers, and finally through a drying oven approximately 30 yards in length of which the first 17 yards was heated at a temperature of 220° F. The mat was passed at a speed of 3 yards per minute. The accelerator content of the treated mat as determined by a burn-off method (ASTM D-2584) was 6.5% by weight. Three layers of the pre-accelerated mat approximately 6 feet by 6 feet were layed out on a sand surface to a double width having a six inch overlap. A general purpose polyester resin, "Paraplex" P43, catalyzed with 3% benzoyl peroxide paste based on the weight of the resin and containing 0.04% by weight of hydroquinone, was poured onto the surface of the mat and spread with an ordinary 36 inch wide rubber floor squeegee. Approximately 60 pounds of resin was used to saturate the mat. Cure accompanied by considerable exotherm occurred within 15 minutes of impregnation at normal room temperatures. A two ton pick-up truck was driven onto the test pad soon after cure and with the front wheels butted up against railroad ties, the back wheels were allowed to spin on the mat until the tires began to smoke. No delamination or meaningful abrasion occurred.

EXAMPLES 2 THROUGH 10

Nine pieces of fiberglass chopped strand mat were immersed in a tray filled with one of the nine accelerator solutions listed below. Upon removal from the solution, the mat was allowed to air dry approximately 24 hours at ambient temperature.

Laminates were then fabricated by manually impregnating four super-imposed, pre-cut squares of a pre-accelerated mat with a mixture of 450 grams of "Paraplex P43", a general purpose polyester resin, 50 grams of styrene monomer, and 20 grams of "Luperco ATC" benzoyl peroxide (50%). The polyester resin contained 4% of benzoyl peroxide and was evenly distributed throughout the mat by scraping a blade over the top of the laminate which also served to compress the four layers. A thermocouple was then inserted in the laminate in order to record the peak exotherm temperature evidencing the cure of the resin. The gel time, peak exotherm, and Barcol hardness rating of laminates prepared utilizing the pre-accelerated mat are tabulated in Table A.

TABLE A

| INGREDIENTS* | 2 | 3 | 4 | 5 | 6 | 7 | 8 | 9 | 10 |
|---|---|---|---|---|---|---|---|---|---|
| Acetone | 50.0 | 50.0 | 50.0 | 50.0 | 50.0 | 50.0 | 50.0 | 50.0 | 50.0 |
| Petroleum Ether | 50.0 | 50.0 | 50.0 | 50.0 | 50.0 | 50.0 | 50.0 | 50.0 | 50.0 |

TABLE A-continued

| INGREDIENTS* | 2 | 3 | 4 | 5 | 6 | 7 | 8 | 9 | 10 |
|---|---|---|---|---|---|---|---|---|---|
| 6% Cobalt Naphthenate | 4.0 | — | 2.0 | 6.0 | — | 3.0 | 10.0 | — | 5.0 |
| m-tolyldiethanol Amine | — | 4.0 | 2.0 | — | 6.0 | 3.0 | — | 10.0 | 5.0 |
| Mat Weight | 30.6 | 31.4 | 32.7 | 20.4 | 34.7 | 34.0 | 34.1 | 31.4 | 28.2 |
| Mat Weight with Coating | 31.6 | 32.7 | 33.9 | 32.9 | 37.2 | 36.5 | 37.0 | 34.0 | 30.4 |
| % by Weight of Coating | 3.27 | 4.14 | 3.67 | 8.2 | 7.2 | 6.8 | 8.50 | 8.28 | 7.80 |
| Gel Time — Minutes | — | 5 | 6.5 | — | 2 | 2.8 | — | 4.5 | 6 |
| Peak Exotherm: ° F | — | 240 | 220 | — | 240 | 265 | — | 250 | 245 |
| Barcol Hardness: | | | | | | | | | |
| ½ hour | 0 | 42 | 50 | 0 | 20 | 45 | 0 | 25 | 45 |
| 1 hour | 0 | 40 | 55 | 0 | 25 | 48 | 0 | 28 | 45 |

*All weights are given as grams of material.

From the data of Table A, it can be seen that no cure is effected when cobalt naphthenate is employed as the sole accelerator. When, however, the cobalt naphthenate is used in combination with m-tolyldiethanol amine the accelerator combination is considerably more effective than a like amount of m-tolyldiethanol amine employed as the sole accelerator. When the examples are repeated employing phenyl diethanol amine with cobalt naphthenate, the results are in general agreement with those of Table A.

EXAMPLE 11

A sample of the polyester resin used in Examples 2 through 10 but free of any inhibitor had a limited shelf life of less than 7 days. When the resin was mixed with 0.1% of hydroquinone based on the weight of the resin, the resin had a shelf life of at least six months.

EXAMPLES 12 THROUGH 16

These examples further illustrate the inhibiting effect on pre-catalyzed polyester resins by certain designated inhibitors. In each example, the same general purpose polyester resin was used marketed by Rohm & Haas under the trademark "Paraplex P-43". The catalyst was a 50% solution of benzoyl peroxide in tricresyl phosphate and used in an amount of 2% by weight of the resin. All samples were stored in the dark at 70° F ± 5° F. Table B indicates the test results. The values for storage stability were those at which checking the stability ended. The resins were still storable in excess of those times.

EXAMPLE 17

Three layers of a glass fiber mat containing about 6% by weight of the mat of an accelerator combination consisting essentially of cobalt naphthanate and m-tolyldiethanolamine, present in equal amounts by weight, were laid out on a sandbed to a double width having 6 inch overlaps. The same general purpose polyester resin of the preceding examples, catalyzed with 3% of benzoyl peroxide, and inhibited by 0.04% of hydroquinone, was poured onto the surface of the mat and spread with a 36 inch wide rubber floor squeegee. Approximately 60 pounds of resin was used to saturate the mat which measured 6 feet by 6 feet. Cure accompanied by considerable exotherm occurred within 15 minutes after resin impregnation.

While the present two component system is particularly designed for use at room temperatures, the system can be used for both hot and cold press molding operations under shop conditions for the prime purpose of simplifying and/or accelerating molding cycles, especially for large parts.

Although the foregoing describes several embodiments of the present invention, it is understood that the invention may still be practiced in other forms within the scope of the following claims.

We claim:

1. A process for forming at a selected time a polymerization reaction product from a pre-catalyzed polyester resin which normally undergoes substantially immediate polymerization due to the presence of such catalyst, comprising:

a. adding to a liquid, curable, thermosetting, unsaturated polyester resin containing a sufficient amount

TABLE B

| | SHELF LIFE OF INHIBITED CATALYZED RESIN | |
|---|---|---|
| Example | Inhibitor and Amount Weight % of Resin | Storage Stability of Resin In Months |
| 12 | Hydroquinone | |
| | 0.04% | 3 |
| | 0.06% | 5 |
| | 0.10% | 9 |
| 13 | Toluhydroquinone | |
| | 0.04% | 3 |
| | 0.06% | 4 |
| | 0.10% | 6 |
| 14 | p-Benzoquinone | |
| | 0.04% | 3 |
| | 0.06% | 4.5 |
| | 0.10% | 6.5 |
| 15 | t-Butyl Catechol | |
| | 0.04% | 1 |
| | 0.06% | 1 |
| | 0.10% | 1 |
| 16 | t-Butyl Catechol/Picric Acid | |
| | 0.02/0.02% | 2.5 |
| | 0.03/0.03% | 3.5 |
| | 0.05/0.05% | 5 | of a peroxide catalyst normally adapted to catalyze further polymerization of said polyester resin, an excessive amount of an inhibitor of sufficiently more than 0.02% by weight of the resin to inhibit catalyzation of the polyester resin by said catalyst for a predetermined time following addition of said inhibitor, and b. at said selected time contacting said pre-catalyzed, inhibited polyester resin with an accelerator combination consisting essentially of a metal soap in which the metal is capable of redox reaction and an aromatic, tertiary amine having the formula:

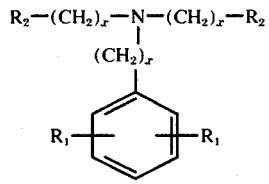

in which $R_1$ represents hydrogen, $CH_3$ or halogen; $R_2$ represents alkyl up to 4 carbon atoms, $R_3OH$ in which $R_3$ represents alkylene up to 4 carbon atoms, or phenyl; and in which the $R_1$'s and the $R_2$'s may be the same or different and $x$ is 0 or 1, said metal soap and amine being present in a weight ratio of about 1:10 to about 1:1, respectively, said accelerator combination being used in sufficient amount to overcome the inhibition of said inhibitor and permit catalyzation of the polyester resin by said peroxide catalyst to cure the resin within less than 1 hour.

2. A process for forming at a selected time within a period up to about nine months a rigid load bearing member from a pre-catalyzed polyester resin which normally undergoes substantially immediate polymerization due to the presence of such catalyst, comprising:

a. adding to a liquid, curable, thermosetting, unsaturated polyester resin containing a sufficient amount of a peroxide catalyst normally adapted to catalyze further polymerization of said polyester resin, an excessive amount of an inhibitor of sufficiently more than 0.02% by weight of the resin to inhibit polymerization of the polyester resin by said catalyst for a period of time up to about nine months following addition of said inhibitor, b. forming a fibrous reinforcement by combining with a fibrous medium on a surface thereof an accelerator combination consisting essentially of a metal soap in which the metal is capable of a redox reaction, and an aromatic tertiary amine having the formula:

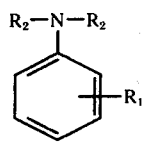

in which $R_1$ represents hydrogen, $CH_3$, or halogen; $R_2$ represents alkyl up to 4 carbon atoms, $R_3OH$ in which $R_3$ represents alkylene up to 4 carbon atoms, or phenyl;

and in which the $R_1$'s and $R_2$'s may be the same or different, said metal soap and amine being present in a weight ratio of about 1:10 to about 1:1 respectively, c. combining said polyester resin with said fibrous reinforcement, and d. overcoming the inhibition of said excessive amount of inhibitor by a sufficient amount of said accelerator combination and polymerizing the polyester resin by said peroxide catalyst to provide said load bearing member.

3. The process of claim 2 in which said polymerization of step d takes place at room temperatures.

4. The process of claim 2 in which said inhibitor is selected from the group consisting of hydroquinone, toluhydroquinone, benzoquinone, t-butyl catechol, and mixtures of t-butyl catechol and picric acid.

5. The process of claim 2 in which said metal of the metal soap is selected from a group consisting of cobalt, vanadium, zirconium, iron, manganese, chromium, tin, aluminum, lead, and copper.

6. The process of claim 2 in which said metal soap is a metal salt of an organic carboxylic acid selected from a group consisting of fatty acids from about 6 to about 20 carbon atoms, benzoic acid, and naphthenic acid.

7. The process of claim 2 in which said fibrous reinforcement is dry, and said aromatic tertiary amine is solid at room temperatures.

8. The process of claim 2 in which said fibrous reinforcement is dry, and said aromatic tertiary amine is solid at room temperature and selected from the group consisting of m-tolyldiethanolamine, phenyldiethanolamine, phenylethylethanolamine, and p-bromo-N,N-dimethylaniline.

9. The process of claim 2 in which said inhibitor is present in an amount of about 0.02 to about 0.2% by weight of said resin.

10. The process of claim 2 in which said aromatic tertiary amine has the formula:

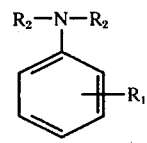

in which $R_1$ and $R_2$ have the same meanings.

11. The process of claim 2 in which said metal soap is cobalt naphthenate.

12. The process of claim 2 in which from about 0.25 to about 4 parts by weight of the accelerator combination are used per 100 parts by weight of the polyester resin.

13. The process of claim 2 in which said liquid unsaturated polyester resin comprises the curable reaction product of a polyhydric alcohol and a polycarboxylic acid or acid anhydride thereof, at least one of which is unsaturated.

14. The process of claim 2 in which said liquid unsaturated polyester resin comprises an unsaturated alkyd resin having a plurality of alpha-beta ethylenically unsaturated groups and an ethylenically unsaturated, cross-linking monomer.

* * * * *